(12) United States Patent
Ko et al.

(10) Patent No.: US 9,430,101 B2
(45) Date of Patent: Aug. 30, 2016

(54) FLAT PANEL DISPLAY WITH INTEGRATED TOUCH SCREEN PANEL

(75) Inventors: Jun-Young Ko, Yongin (KR); Kwan-Young Han, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 849 days.

(21) Appl. No.: 13/155,161

(22) Filed: Jun. 7, 2011

(65) Prior Publication Data
US 2012/0105344 A1 May 3, 2012

(30) Foreign Application Priority Data
Oct. 29, 2010 (KR) .................. 10-2010-0106741

(51) Int. Cl.
G09G 3/30 (2006.01)
G06F 3/041 (2006.01)
G06F 3/044 (2006.01)

(52) U.S. Cl.
CPC .................. G06F 3/044 (2013.01)

(58) Field of Classification Search
CPC ........ G06F 3/041; G06F 3/042; G06F 3/044; G06F 3/045; G09G 5/00; G09G 3/30
USPC .............. 345/173–178; 178/18.01–20.04
See application file for complete search history.

(56) References Cited

U.S. PATENT DOCUMENTS

| 2004/0178997 A1* | 9/2004 | Gillespie et al. ............ 345/173 |
| 2004/0191566 A1* | 9/2004 | Kikuchi et al. ............. 428/690 |
| 2004/0212772 A1* | 10/2004 | Hanakawa ............ G02F 1/1345 349/153 |
| 2005/0099402 A1* | 5/2005 | Nakanishi et al. ........... 345/173 |
| 2006/0017707 A1* | 1/2006 | Fukui et al. ................... 345/173 |
| 2006/0139554 A1* | 6/2006 | Park .............................. 349/152 |
| 2006/0152500 A1* | 7/2006 | Weng ............................. 345/173 |
| 2006/0152668 A1 | 7/2006 | Jang et al. |
| 2008/0123032 A1 | 5/2008 | Taniguchi et al. |
| 2008/0238311 A1* | 10/2008 | Sung .................. H01L 51/5237 313/512 |
| 2008/0246741 A1* | 10/2008 | Hinata ......................... 345/173 |

(Continued)

FOREIGN PATENT DOCUMENTS

| CN | 101349877 A | 1/2009 |
| JP | 2001-192240 A | 7/2001 |

(Continued)

OTHER PUBLICATIONS

EPO Search Report dated Oct. 21, 2013, for corresponding European Patent application 11183360.4, (6 pages).

(Continued)

*Primary Examiner* — Ilana Spar
*Assistant Examiner* — Nguyen H Truong
(74) *Attorney, Agent, or Firm* — Lewis Roca Rothgerber Christie LLP (57) ABSTRACT

A flat panel display with an integrated touch screen panel includes upper and lower substrates each including a display area and first and second non-display areas around an outside of the display area. A plurality of sensing patterns are in the display area of the upper substrate. A plurality of sensing lines are in the first non-display area of the upper substrate and connected to the sensing patterns. A sealing member is between the second non-display areas of the upper and lower substrates. The upper substrate is a window substrate positioned as an uppermost one of a plurality of substrates provided in the flat panel display.

19 Claims, 7 Drawing Sheets

(56) References Cited

U.S. PATENT DOCUMENTS

| | | |
|---|---|---|
| 2009/0021687 A1 | 1/2009 | Kwack et al. |
| 2009/0188726 A1* | 7/2009 | Chang et al. ............ 178/18.03 |
| 2010/0013745 A1* | 1/2010 | Kim et al. ..................... 345/76 |
| 2010/0110041 A1* | 5/2010 | Jang ............................. 345/174 |
| 2010/0164881 A1* | 7/2010 | Kuo et al. .................... 345/173 |
| 2010/0225613 A1* | 9/2010 | Iwasaki ........................ 345/174 |
| 2010/0253656 A1* | 10/2010 | Fujikawa ..................... 345/204 |
| 2011/0012873 A1* | 1/2011 | Prest et al. ................... 345/204 |
| 2011/0025612 A1* | 2/2011 | Shiau ........................... 345/173 |
| 2011/0109590 A1 | 5/2011 | Park |
| 2011/0279763 A1 | 11/2011 | Cho et al. |
| 2011/0285641 A1* | 11/2011 | Huang ......................... 345/173 |

FOREIGN PATENT DOCUMENTS

| | | |
|---|---|---|
| JP | 2007-114662 A | 5/2007 |
| JP | 2007-212813 A | 8/2007 |
| JP | 2008-009921 A | 1/2008 |
| JP | 2008-083491 A | 4/2008 |
| JP | 2009-104131 A | 5/2009 |
| JP | 2009-116433 A | 5/2009 |
| JP | 2009-258182 A | 11/2009 |
| JP | 2010-033478 A | 2/2010 |
| JP | 2010-080064 A | 4/2010 |
| JP | 2010-225569 A | 10/2010 |
| JP | 2011-526023 A | 9/2011 |
| KR | 10-2007-0119560 A | 12/2007 |
| KR | 10 2009 0052240 A | 5/2009 |
| KR | 10 2009 0093671 A | 9/2009 |
| KR | 10-2010-0010019 A | 1/2010 |
| KR | 10 2010 0042373 A | 4/2010 |
| KR | 10 2010 0084252 A | 7/2010 |
| KR | 10-2011-0126365 | 11/2011 |
| TW | 200639541 A | 11/2006 |
| TW | 200807079 A | 2/2008 |
| TW | 200908200 A | 2/2009 |
| WO | WO 2009/157645 A1 | 12/2009 |

OTHER PUBLICATIONS

KIPO Office action dated May 18, 2012 in priority application KR 10-2010-0106741 (4 pages).

Japanese Patent Office action dated Nov. 20, 2012 for corresponding JP Patent Application No. 2011-006796 (2 pages).

KIPO Notice of Allowance dated Jul. 27, 2012, for Korean priority Patent application 10-2010-0106741, (1 page).

Taiwanese Office action dated Jun. 23, 2014, with English translation, corresponding to Taiwan Patent application 100124753, (20 pages).

* cited by examiner

FLAT PANEL DISPLAY WITH INTEGRATED TOUCH SCREEN PANEL

CROSS-REFERENCE TO RELATED APPLICATION

This application claims priority to and the benefit of Korean Patent Application No. 10-2010-0106741, filed on Oct. 29, 2010, in the Korean Intellectual Property Office, the entire content of which is incorporated herein by reference.

BACKGROUND

1. Field

An aspect of the present invention relates to a flat panel display, and more particularly, to a flat panel display with an integrated touch screen panel.

2. Description of Related Art

A touch screen panel is an input device that allows a user's instruction to be inputted by selecting content displayed on a screen of an image display or the like with a user's hand or object.

Generally, the touch screen panel is formed on a front face of an image display to convert a contact position into an electrical signal. Here, the user's hand or object comes directly in contact with the touch screen panel at a contact position. Accordingly, the content selected at the contact position is inputted as an input signal to the image display.

Since a touch screen panel can be substituted for or replace a separate input device connected to an image display, such as a keyboard or mouse, its fields of application have been gradually expanded.

Touch screen panels can be categorized as resistive overlay touch screen panels, photosensitive touch screen panels, or capacitive touch screen panels, among others. Among these touch screen panels, the capacitive touch screen panel converts a contact position into an electrical signal by sensing a change in capacitance formed between a conductive sensing pattern and an adjacent sensing pattern, a ground electrode, or other feature when a user's hand or object is in contact with the touch screen panel.

Generally, such a touch screen panel is separately manufactured and then attached to an outer face of a display panel of a flat panel display such as a liquid crystal display or an organic light emitting display. In order to enhance the strength of the device, a window is additionally provided to a top surface of the touch screen panel.

However, in a case where a separately manufactured touch screen panel and window are stacked and attached to an outer face of the display panel of a flat panel display, the entire thickness of the flat panel display is increased, and manufacturing costs are also increased. Further, visibility of an image is degraded due to a gap between the touch screen panel and the display panel.

In this case, a driving IC for the display panel and a driving IC for the touch screen panel are generally provided separately, and therefore, compatibility between products is not easily achieved. Further, since the driving ICs are also connected to separate flexible printed circuit boards (FPCBs), manufacturing processes are more complicated, and production cost is increased.

SUMMARY OF THE INVENTION

Embodiments of the present invention provide a flat panel display with an integrated touch screen panel, in which an upper substrate of a display panel is used as a reinforced transparent substrate to serve as a window, and also used as a substrate of the touch screen panel to decrease the thickness of the flat panel display and to improve visibility of an image. The touch screen panel and the display panel may also be connected to one flexible printed circuit board (FPCB), to simplify manufacturing processes and to reduce costs.

According to an aspect of an embodiment of the present invention, there is provided a flat panel display with an integrated touch screen panel, including: upper and lower substrates each including a display area and first and second non-display areas around an outside of the display area; a plurality of sensing patterns in the display area of the upper substrate; a plurality of sensing lines in the first non-display area of the upper substrate and connected to the sensing patterns; and a sealing member between the second non-display areas of the upper and lower substrates, wherein the upper substrate is a window substrate positioned as an uppermost one of a plurality of substrates provided in the flat panel display.

The upper substrate may be a glass substrate having a surface that is subjected to reinforcement treatment.

The reinforcement treatment of the surface may include replacing sodium (Na) elements on the surface of the glass substrate with potassium (K) elements.

The flat panel display may further include a first bonding pad portion in the second non-display area of the upper substrate, the first bonding pad portion including a plurality of first bonding pads connected to the plurality of sensing lines; a plurality of pads in the second non-display area of the lower substrate overlapping with the sealing member; and a second bonding pad portion in the second non-display area of the upper substrate adjacent to the first bonding pad portion, the second bonding pad portion including a plurality of second bonding pads electrically connected to the plurality of pads of the lower substrate.

A plurality of conducting members electrically connected to respective ones of the pads of the lower substrate may be in the sealing member and overlapping with the plurality of pads of the lower substrate. The plurality of conducting members may include conducting balls.

A plurality of metal patterns that connect the plurality of conducting members with the second bonding pads may be in the second non-display area of the upper substrate. An FPCB configured to be electrically connected to the first and second bonding pads may be configured to be attached to an end portion of the second non-display area of the upper substrate.

A length of the upper substrate may be longer than a length of the lower substrate. A black matrix may be in the first and second non-display areas of the upper substrate to outline the display area.

The sensing patterns may include first sensing cells connected along a first direction; first connection lines for connecting the first sensing cells along the first direction; second sensing cells connected along a second direction; and second connection lines for connecting the second sensing cells along the second direction.

The sensing patterns may be in a same layer. The second sensing cells may be integrally formed with the second connection lines. The flat panel display may further include an insulating layer interposed at crossing regions between the first and second connection lines.

The sensing patterns may be on an inner surface of the upper substrate facing the lower substrate, or may be on an outer surface of the upper substrate.

The first and second sensing cells may be in different layers. The first sensing cells and the first connection lines may be on an inner surface of the upper substrate, and the second sensing cells and the second connection lines may be on an outer surface of the upper substrate.

A plurality of pixels may be in the display area of the lower substrate, and a plurality of signal lines may be in the first non-display area of the lower substrate for electrically connecting the plurality of pixels to the pads in the second non-display area of the lower substrate.

The plurality of signal lines may include a plurality of scan lines and a plurality of data lines.

A silicon compound may be in a region between the upper and lower substrates, or a plurality of polymer insulating layers having different refractive indices may be in a region between the upper and lower substrates.

The flat panel display may further include a plurality of metal patterns in the non-display area of the lower substrate to be electrically connected to the plurality of sensing lines in the first non-display area of the upper substrate; and conducting members provided between the metal patterns of the lower substrate and the sensing lines of the upper substrate to connect the metal patterns of the lower substrate to the sensing lines of the upper substrate.

The conducting members may be in the first non-display area of the lower substrate. The conducting members may be in the shape of conducting spacers.

An FPCB configured to be electrically connected to the metal patterns may be configured to be attached to an end portion of the second non-display area of the lower substrate.

As described above, according to embodiments of the present invention, an upper substrate of a flat pan& display is used as a window and as a substrate of a touch screen panel, to reduce the thickness of the flat panel display and to improve transmittance by decreasing the number of substrates.

Also, sensing patterns of the touch screen panel are formed on an inner surface of the upper substrate, to improve the visibility of an image and to enhance the durability and reliability of the touch screen panel.

Also, the touch screen panel and the display panel are connected to one FPCB, to simplify manufacturing processes and to reduce costs. Also, the FPCB is positioned in a non-display area of the upper substrate, so that the image display area can be maximized or increased, thereby minimizing or reducing dead space.

Also, a silicon compound may be filled in a region between the upper and lower substrate, or polymer insulating layers may be stacked between the upper and lower substrate, to prevent or reduce the penetration of moisture, to improve transmittance through refractive index matching, and/or to minimize or reduce the occurrence of noise caused by parasitic capacitances.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION OF THE EMBODIMENTS

In the following detailed description, only certain exemplary embodiments of the present invention have been shown and described by way of illustration. As those skilled in the art will recognize, the described embodiments may be modified in various different ways without departing from the spirit or scope of the present invention. Accordingly, the drawings and description are to be regarded as illustrative in nature and not restrictive. In addition, when an element is referred to as being "on" another element, it may be directly on the other element, or may be indirectly on the other element with one or more intervening elements interposed therebetween. Also, when an element is referred to as being "connected to" another element, it may be directly connected to the other element, or may be indirectly connected to the other element with one or more intervening elements interposed therebetween. In addition, like reference numerals refer to like elements.

Hereinafter exemplary embodiments of the present invention will be described in detail with reference to the accompanying drawings.

Figure 1:
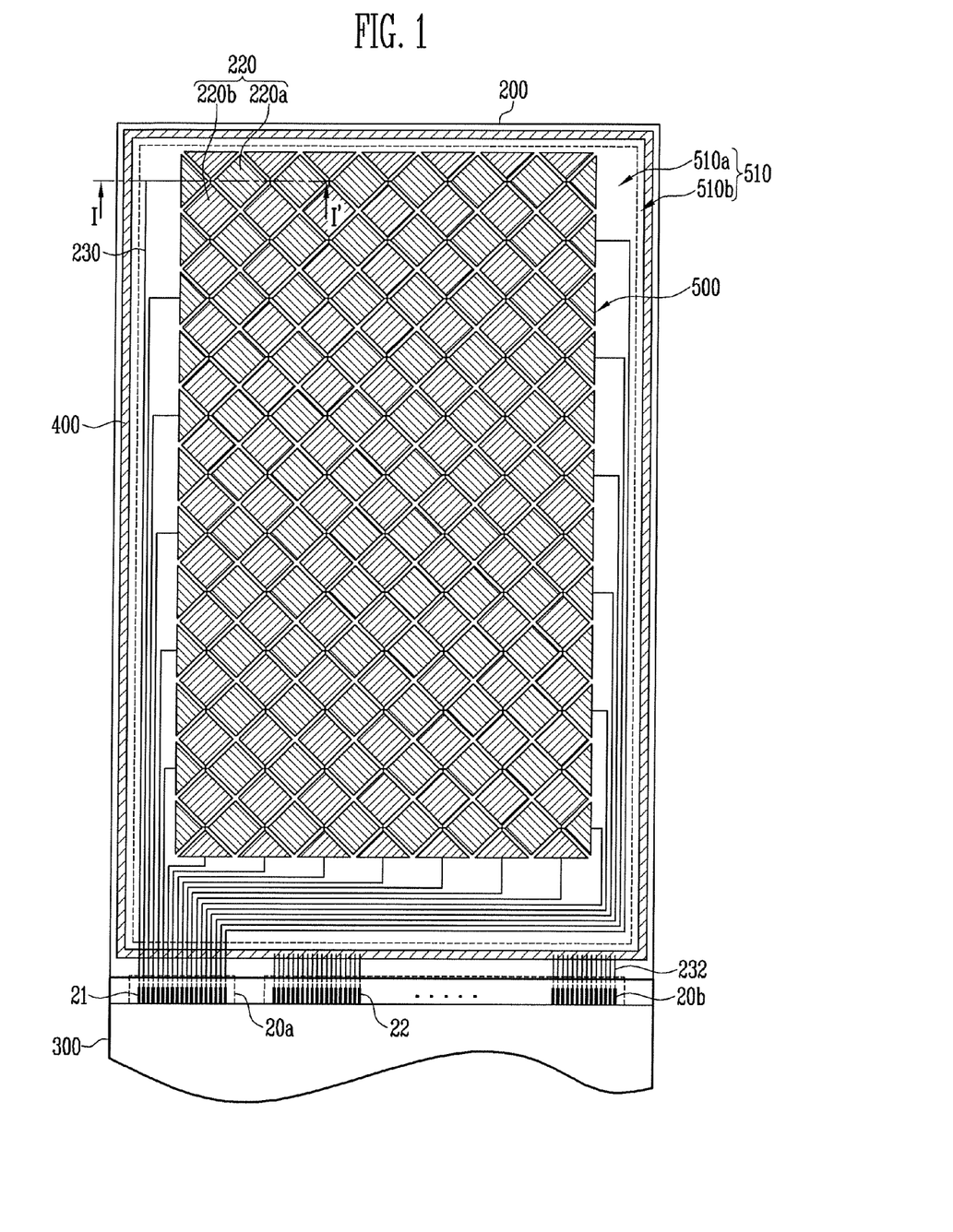
FIG. 1 is a plan view showing an upper substrate of a flat panel display according to an embodiment of the present invention.
Figure 2:
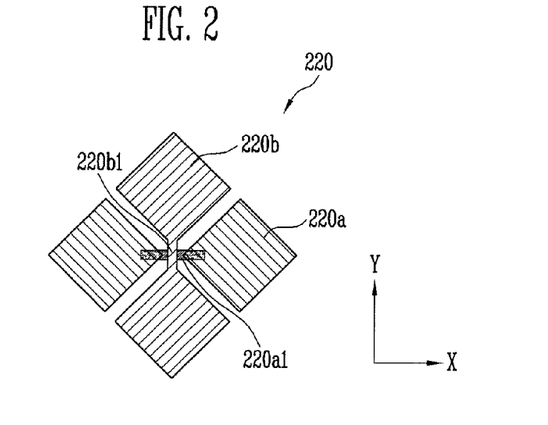
FIG. 2 is an enlarged view showing an example of a sensing pattern shown in FIG. 1.
Figure 3:
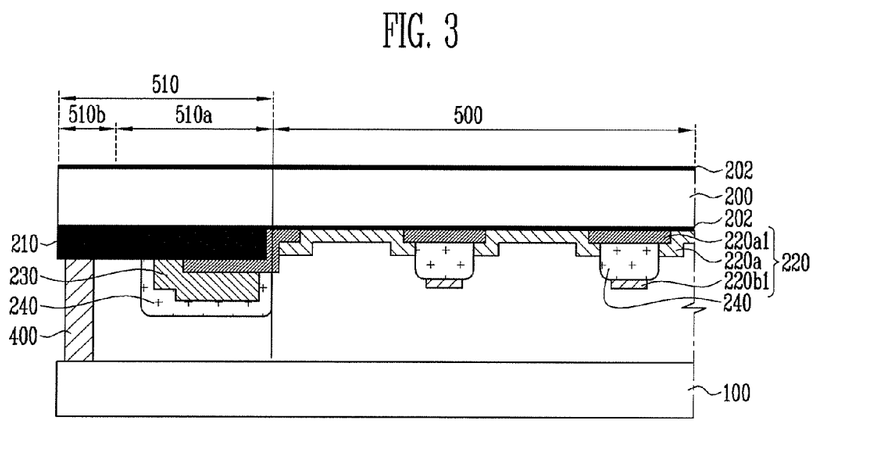
FIG. 3 is a cross-sectional view showing a partial area (I-I') of the flat panel display of FIG. 1 according to the embodiment of the present invention.

FIG. 1 is a plan view showing an upper substrate of a flat panel display according to an embodiment of the present invention. FIG. 2 is an enlarged view showing an example of a sensing pattern shown in FIG. 1. FIG. 3 is a cross-sectional view showing a partial area (I-I') of the flat panel display of FIG. 1 according to an embodiment of the present invention.

An exemplary embodiment of the present invention provides a flat panel display with an integrated touch screen panel. Referring to FIGS. 1 to 3, a touch screen panel according to an embodiment of the present invention is directly formed on one surface of an upper substrate 200 of the flat panel display.

In this instance, the one surface of the upper substrate 200 is a surface that comes in contact with a lower substrate, and corresponds to an inner surface of the upper substrate 200 with respect to the flat panel display. That is, FIG. 1 is a plan view of an inner surface of the upper substrate 200 in the flat panel display according to the embodiment of the present invention.

In various other embodiments, the touch screen panel may be formed on an outer surface of the upper substrate 200. Alternatively, first sensing cells that constitute sensing patterns of the touch screen panel may be formed on an inner surface of the upper substrate 200, and second sensing cells alternately disposed so as not to overlap with the first sensing cells may be formed on an outer surface of the upper substrate 200.

The flat panel display may be an organic light emitting display or a liquid crystal display, among others. In this embodiment, an organic light emitting display is described as an example of the flat panel display, and therefore, the upper substrate 200 may act as a sealing substrate of the organic light emitting display. The upper substrate 200 may be formed of a transparent material.

In this embodiment, the upper substrate 200 serves not only as a sealing substrate but may also serve as a window provided to increase the mechanical strength of the flat panel display.

That is, the upper substrate 200 may be set as a window substrate positioned at the uppermost portion of substrates provided to the flat panel display. To this end, the upper substrate 200 may be implemented as a reinforced glass substrate.

For example, the reinforced glass substrate may be implemented through a process of immersing the glass substrate in a $KNO_3$ solution and then heating the glass substrate at a temperature of 400 to 450° C. for 15 to 18 hours. Through such a process, sodium (Na) elements that exist on a surface of the glass substrate are replaced with potassium (K) elements, thereby reinforcing the strength of the surface of the glass substrate.

That is, the strength of a surface 202 of the reinforced glass substrate 200 may be reinforced by replacing sodium (Na) elements that exist on the surface 202 with potassium (K) elements.

As shown in FIG. 1, the touch screen panel according to this embodiment includes sensing patterns 220 formed on a rear surface of the upper substrate 200, i.e., the transparent substrate that serves as a window and a sealing substrate, and sensing lines 230 that connect the sensing patterns 220 to an external driving circuit (not shown) through a first bonding pad portion 20a.

In this instance, an area in which the plurality of sensing patterns 220 are formed is a display area 500 for displaying an image and detecting a touch position.

Meanwhile, an area in which sensing lines 230 electrically connected to the sensing patterns 220 and the first bonding pad portion 20a are formed is a non-display area 510 provided along the outside of the display area 500.

In this embodiment, the non-display area 510 is divided into a first non-display area 510a in which the sensing lines 230 are formed, and a second non-display area 510b positioned along the outside of the first non-display area 510a and including a plurality of first bonding pads 21 connected to the respective sensing lines 230.

Here, the second non-display area 510b may be an area in which a sealing member 400 formed between the upper and lower substrates 200 and 100 is coated, so that the upper and lower substrates 200 and 100 of the organic light emitting display can be joined together. The upper and lower substrates 200 and 100 may be joined together by irradiating laser onto the second non-display area 510b to cure the sealing member 400.

As shown in FIG. 1, a second bonding pad portion 20b may be provided adjacent to the first bonding pad portion 20a in the second non-display area 510b. A plurality of second bonding pads 22 provided to the second bonding pad portion 20b are connected to the metal patterns 232, respectively. The metal patterns 232 are electrically connected to one another through a plurality of signal lines (data and scan lines, not shown) that may be arranged on the lower substrate 100 and a plurality of conducting media (not shown) formed in the sealing member 400. This will be described in detail with reference to the following FIGS. 4 to 6.

The first and second bonding pad portions 20a and 20b can be electrically connected to a flexible printed circuit board (FPCB) 300 attached to an inner surface of the upper substrate 200.

In this instance, the FPCB 300 is electrically connected to a driving IC (not shown) for driving a plurality of pixels (not shown) provided to a pixel area on the lower substrate 100. Accordingly, in this embodiment, the touch screen panel and a display panel of the flat panel display share one FPCB.

A touch panel driving circuit for driving the touch screen panel may be integrated on a driving IC (not shown). The driving IC (not shown) may be directly mounted on the second non-display area 510b of the upper substrate 200, or may be mounted on the FPCB 300.

The structure of the touch screen panel according to this embodiment will be described in detail with reference to FIGS. 1 and 2.

As shown in FIG. 2, the sensing patterns 220 include first sensing cells 220a that may be connected along a first direction (e.g., an X-axis direction or row direction), first connection lines 220a1 that connect the first sensing cells 220a along the first direction, second sensing cells 220b that may be connected along a second direction (e.g., a Y-axis direction or column direction), and second connection lines 220b1 that connect the second sensing cells 220b along the second direction.

The first and second sensing cells 220a and 220b are arranged to not overlap with each other, and the first and second connection lines 220a1 and 220b1 cross with one another. In this instance, an insulating layer (not shown) for ensuring stability may be interposed between the first and second connection lines 220a1 and 220b1.

Meanwhile, the first and second sensing cells 220a and 220b may be integrally formed with the respective first and second connection lines 220a1 and 220b1 by using a transparent electrode material such as indium tin oxide (hereinafter referred to as ITO). Alternatively, the first and second sensing cells 220a and 220b may be separately formed from the respective first and second connection lines 220a1 and 220b1, and then electrically connected to the respective first and second connection lines 220a1 and 220b1.

For example, the second sensing cells 220b may be integrally patterned in the second direction with the second connection lines 220b1, while the first sensing cells 220a may be patterned separetely between the respective second sensing cells 220b. The first sensing cells 220a may then be connected along the first direction by the first connection lines 220a1 positioned at an upper or lower position with respect to the first sensing cells 220a (e.g., above or below the first sensing cells 220a).

In this instance, the first connection lines 220a1 may come in direct contact with the first sensing cells 220a at an upper or lower portion of the first sensing cells 220a, or may be electrically connected to the first sensing cells 220a through contact holes or the like.

The first connection lines 220a1 may be formed of a transparent electrode material such as ITO, or may be formed of a low-resistance opaque metallic material. The width of the first connection lines 220a1 may be adjusted so as to prevent or reduce the visualization or visibility of the first connection lines 220a1.

The sensing lines (metal electrodes) 230 are electrically connected to row lines of the first sensing cells 220a and column lines of the second sensing cells 220b, respectively, so as to connect them to an external driving circuit (not shown) such as a position detecting circuit through the first bonding pad portion 20a.

The sensing lines (metal electrodes) 230 are disposed in the first non-display area 510a positioned around the outer portion of the display area 500. The sensing lines 230 may be formed of a transparent electrode material used to form the sensing patterns 220, and/or may be formed of a low-resistance metallic material such as molybdenum (Mo), silver (Ag), titanium (Ti), copper (Cu), aluminum (Al) or Mo/Al/Mo.

The touch screen panel configured as described above is a capacitive touch screen panel. If a contact object such as a user's finger or stylus pen comes in contact with the touch screen panel, a change in capacitance at the contact position is transferred from the sensing patterns 220 to the driving circuit (not shown) via the sensing lines (metal electrodes) 230 and the first bonding pad portion 20a. Then, the change in capacitance is converted into an electrical signal by X and Y input processing circuits (not shown), thereby detecting details with respect to the contact position.

FIG. 3 is a cross-sectional view showing a partial area (I-I') of FIG. 1.

Referring to FIG. 3, as described above, the sensing patterns 220 formed on the display area of the upper substrate 200 include first sensing cells 220a connected along a first direction (e.g., a row direction), first connection lines 220a1 that connect the first sensing cells 220a along the first direction, second sensing cells 220b connected along a second direction (e.g., a column direction), and second connection lines 220b1 that connect the second sensing cells 220b along the second direction. An insulating layer 240 is interposed at crossing regions between the first and second connection lines 220a1 and 220b1.

As shown in FIG. 3, a black matrix 210 may be formed in the non-display area 510 of the upper substrate 200, and the sensing lines 230 electrically connected to the sensing patterns 220 may be formed in the first non-display area 510a overlapping the black matrix 210. The sealing member 400 may be formed in the second non-display area 510b so that the upper and lower substrates 200 and 100 are joined together.

In this instance, the black matrix 210 functions to prevent or reduce the patterns including the sensing lines from being visualized or visible, and to form an outline of the display area.

Figure 4:
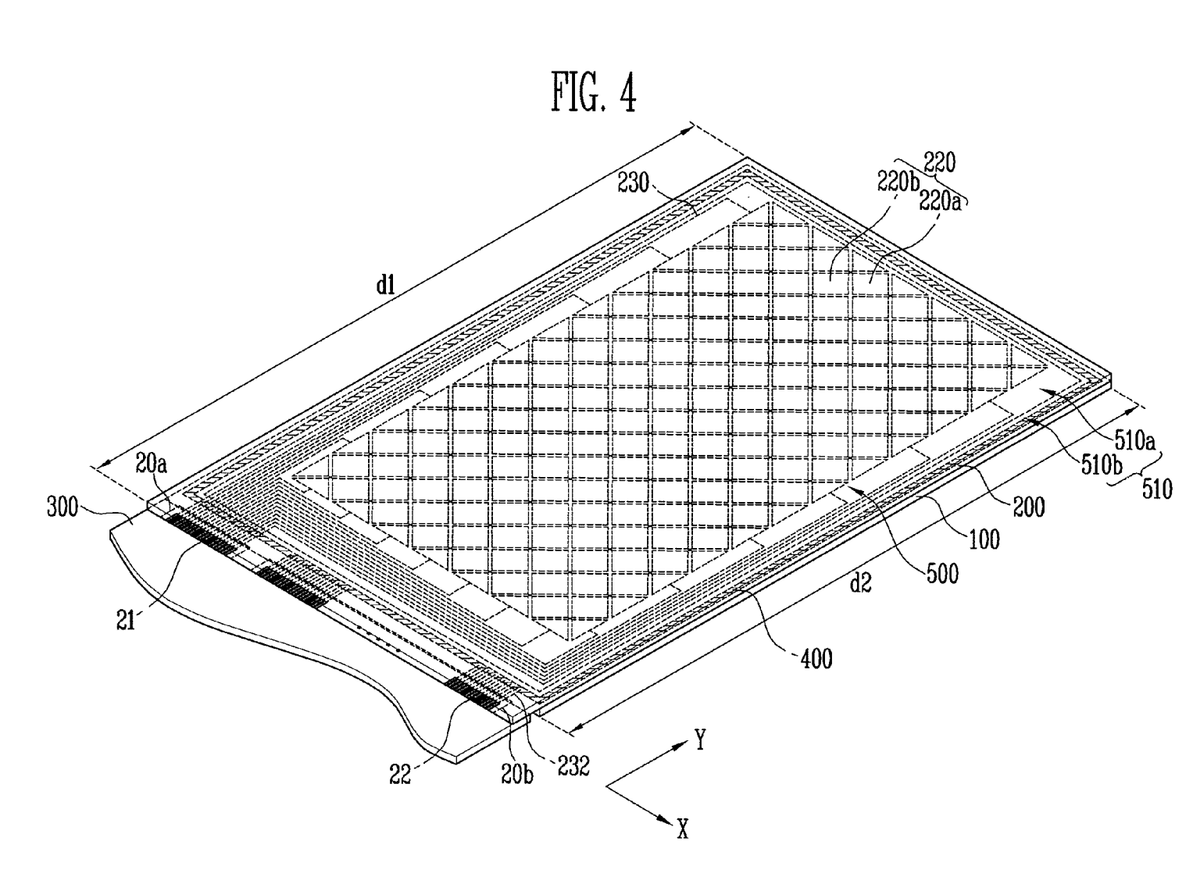
FIG. 4 is a perspective view showing a flat panel display with an integrated touch screen panel according to an embodiment of the present invention.
Figure 5:
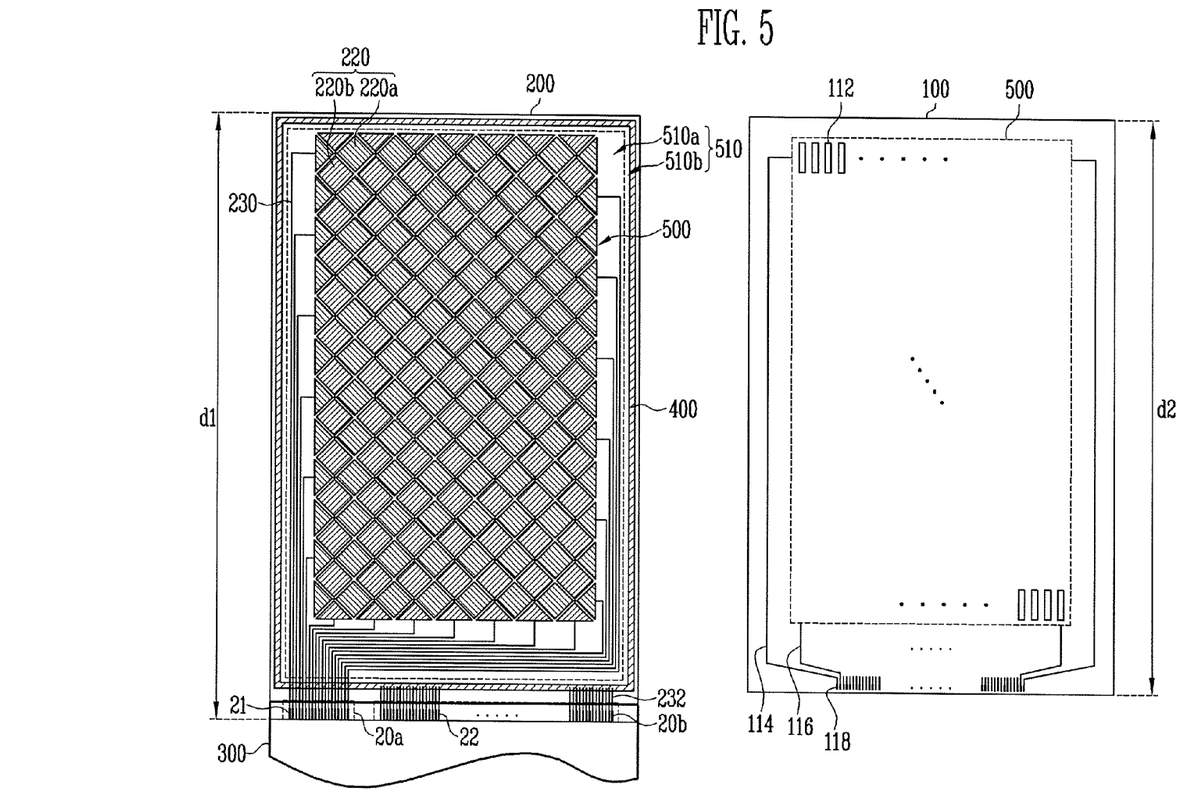
FIG. 5 is a separated plan view illustrating upper and lower substrates shown in FIG. 4.

FIG. 4 is a perspective view showing a flat panel display with an integrated touch screen panel according to an embodiment of the present invention. FIG. 5 is a separated plan view illustrating upper and lower substrates shown in FIG. 4.

Figure 6A:
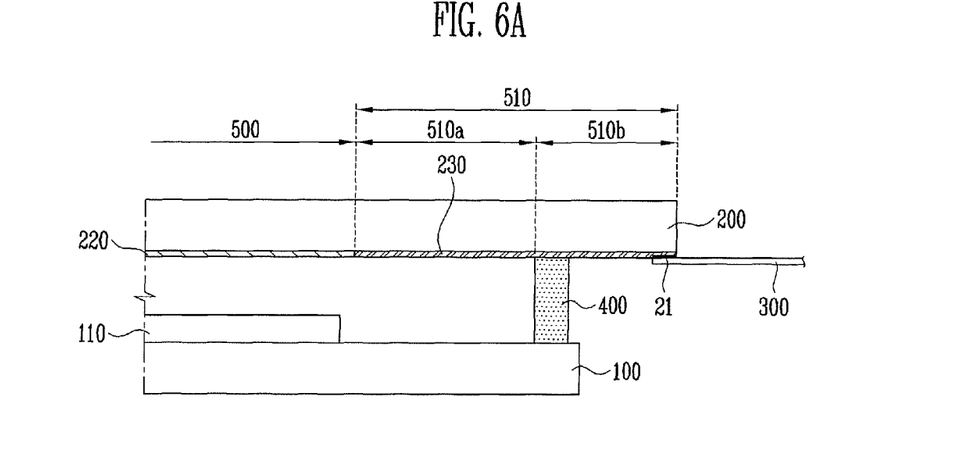
FIG. 6A is a partial cross-sectional view showing an area including a first bonding pad portion of FIG. 5.
Figure 6B:
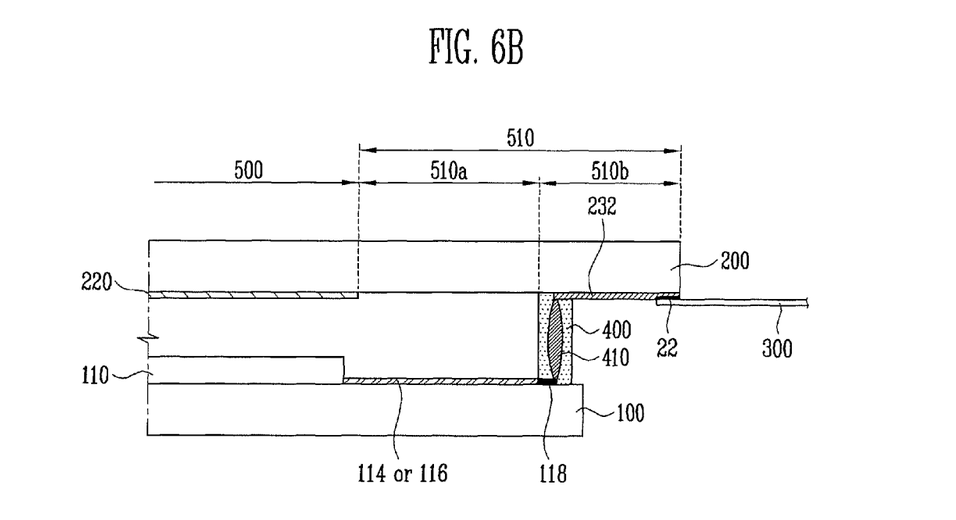
FIG. 6B is a partial cross-sectional view showing an area including a second bonding pad portion of FIG. 5.

FIG. 6A is a partial cross-sectional view showing an area including a first bonding pad portion of FIG. 5. FIG. 6B is a partial cross-sectional view showing an area including a second bonding pad portion of FIG. 5.

In FIGS. 5 and 6, detailed descriptions of components formed in a display area 500 of a display panel for displaying an image will be omitted.

This embodiment provides a flat panel display with an integrated touch screen panel, in which sensing patterns 220 and sensing lines 230 of the touch screen panel are formed on an inner surface of an upper substrate 200 that seals a plurality of pixels 112 formed in a display area 500 of a lower substrate 100.

Here, the flat panel display according to this embodiment is implemented as an organic light emitting display in which each of the pixels 112 is provided with an organic light emitting element (not shown), a thin film transistor (not shown) and a capacitor (not shown). However, the present invention is not limited thereto.

More specifically, the flat panel display with the integrated touch screen panel according to this embodiment includes a display panel including lower and upper substrates 100 and 200 opposite to each other, and sensing patterns 220 and sensing lines 230 formed on a surface of the upper substrate 200 that faces the lower substrate 100.

The lower substrate 100 is divided into a display area 500 having a plurality of pixels 112 formed therein and a non-display area 510 positioned around the outside of the display area 500. In this instance, the display and non-display areas of the lower substrate 100 are overlapped with those of the upper substrate 200, respectively.

That is, as shown in FIG. 6B, the non-display area 510 of the lower substrate 100 is also divided into a first non-display area 510a in which signal lines 114 and 116 are formed, and a second non-display area 510b in which pads 118 connected to the signal lines are formed.

In this embodiment, the signal lines (i.e., the scan and data lines 114 and 116 which apply a predetermined signal to the plurality of pixels 112) in the display area 500 of the lower substrate 100 are connected to the respective pads 118 positioned in the second non-display area 510b of the lower substrate 100. The respective pads 118 are electrically connected to metal patterns 232 and second bonding pads 22 positioned in the second non-display area 510b of the upper substrate 200 through a plurality of conducting media (e.g., conducting balls 410) provided in an interior of the sealing member 400 as shown in FIG. 6B.

Referring to FIGS. 5 and 6A, the sensing lines 230 formed on the rear surface of the upper substrate 200 are electrically connected to first bonding pads 21 positioned adjacent to the second bonding pads 22 in the second non-display area 510b.

A first bonding pad portion 20a including the first bonding pads 21 and a second bonding pad portion 20b including the second bonding pads 22 can be electrically connected to an FPCB 300 attached to or contacting an inner surface of the upper substrate 200. Accordingly, in this embodiment, the touch screen panel and the display panel of the flat panel display can share one FPCB with one another.

That is, the FPCB 300 can be connected to the sensing lines 230 of the touch screen panel to supply a control signal for controlling the touch screen panel and to supply a control signal for controlling the display panel to the signal lines 114 and 116 of the display panel through the metal patterns 232 and the conducting balls 410.

In this case, the FPCB 300 may be implemented such that an FPCB for driving the display panel and an FPCB for driving the touch panel are integrated together. Thus, the bonding and testing processes of the FPCB 300 are simpler than those in a case where FPCBs for respectively driving the touch panel and the display panel are separately provided, simplifying manufacturing processes and reducing costs.

In this embodiment, since the FPCB 300 is joined with the upper substrate 200 at one end of the upper substrate 200, a length d1 of the upper substrate 200 is longer than a length d2 of the lower substrate 100.

Here, the FPCB 300 may not be physically joined with the lower substrate 100, so that an image display area of the display panel, implemented on the lower substrate, can be maximized or increased as compared with a conventional flat panel display, thereby minimizing or reducing dead space.

Figure 7A:
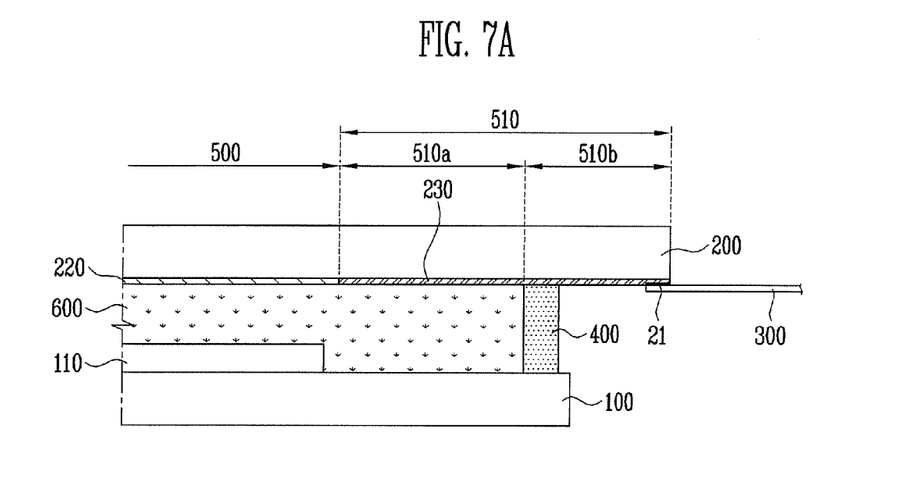
FIGS. 7A and 7B are cross-sectional views showing one area of a flat panel display with an integrated touch screen panel according to another embodiment of the present invention.
Figure 7B:
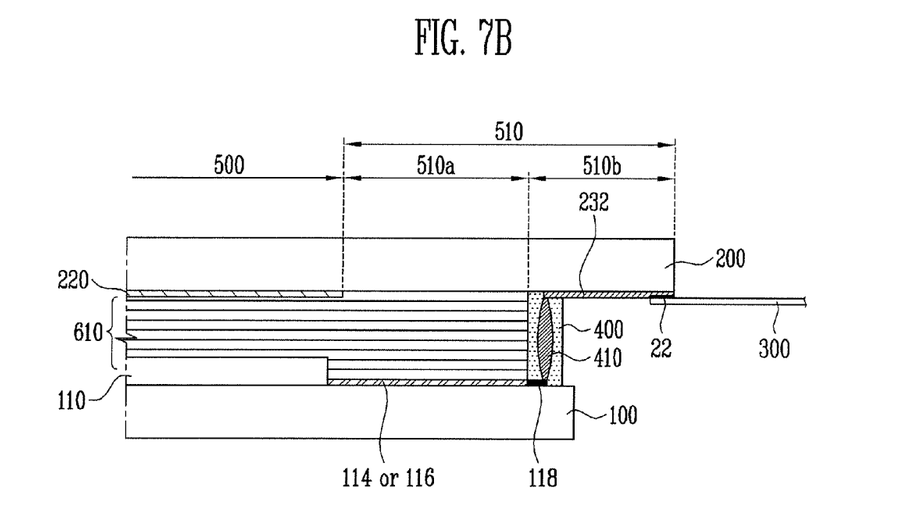

FIGS. 7A and 7B are sectional views showing one area of a flat panel display with an integrated touch screen panel according to another embodiment of the present invention.

Since FIGS. 7A and 7B are cross-sectional views of areas substantially the same as those of FIGS. 6A and 6B, respectively, components identical to those in FIGS. 6A and 6B are designated by the same reference numerals, and their detailed descriptions will be omitted.

In the embodiment shown in FIG. 7A, a silicon compound 600 is filled in a region between the upper and lower substrates 200 and 100.

The silicon compound 600 is filled in the region between the upper and lower substrates 200 and 100, to prevent or reduce moisture or the like from penetrating the sealing member 400. Further, since the silicon compound 600 has a high dielectric property, noise caused by parasitic capacitances between the sensing patterns 220 formed on the inner surface of the upper substrate 200 and the pixels 112 formed in the display area 500 of the lower substrate 100 can be reduced.

In the embodiment shown in FIG. 7B, a plurality of polymer insulating layers 610 having different refractive indices are stacked between the upper and lower substrates 200 and 100.

Like the silicon compound 600 shown in FIG. 7A, the plurality of polymer insulating layers 610 can prevent or reduce moisture or the like from penetrating the sealing member 400, and noise caused by parasitic capacitances between the sensing patterns 220 and the pixels 112 can be reduced. Furthermore, the plurality of polymer insulating layers 610 having different refractive indices are stacked between the upper and lower substrates 200 and 100 so that transmittance can be improved through refractive index matching.

Figure 8:
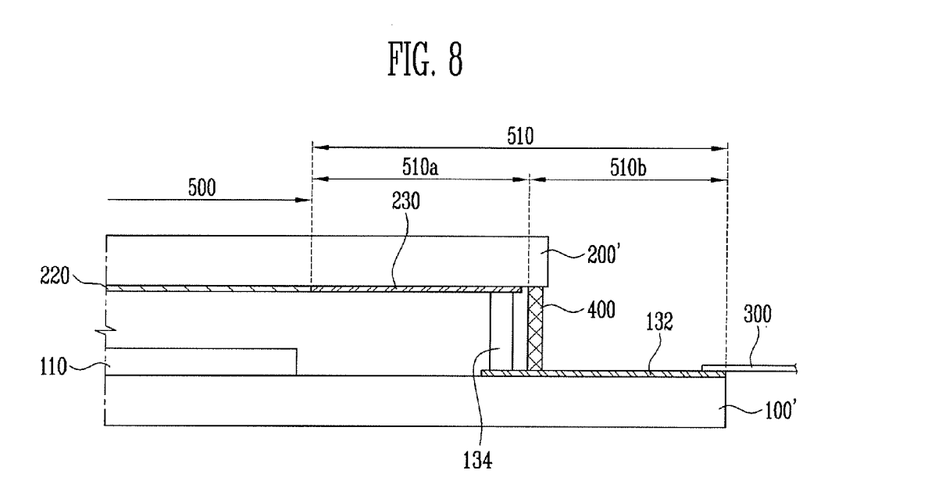
FIG. 8 is a cross-sectional view showing one area of a flat panel display with an integrated touch screen panel according to still another embodiment of the present invention.

FIG. 8 is a cross-sectional view showing one area of a flat panel display with an integrated touch screen panel according to still another embodiment of the present invention.

Since FIG. 8 is a cross-sectional view of an area substantially the same as that of FIG. 6A, components identical to those in FIG. 6A are designated by the same reference numerals, and their detailed descriptions will be omitted.

The embodiment shown in FIG. 8 is different from the aforementioned embodiment in that the FPCB 300 is not joined with an upper substrate 200,' but is instead joined with a lower substrate 100' at one end of the lower substrate 100'.

That is, in the embodiment shown in FIG. 8, metal patterns 132 are formed in the non-display area 510 on a top surface of the lower substrate 100'. The metal patterns 132 are electrically connected to the sensing lines 230 formed on the upper substrate 200' through conducting members 134.

As shown in FIG. 8, the metal patterns 132 are electrically connected to the FPCB 300 joined with the lower substrate 100' at the one end of the lower substrate 100'. Accordingly, the touch screen panel formed on the upper substrate 200' and the display panel formed on the lower substrate 100' can share one FPCB 300.

In this instance, the conducting members 134 may be formed in the first non-display area 510a, and may be formed in various shapes. For example, the conducting members 134 may be formed in the shape of a conducting spacer.

Generally, a number of sensing patterns 220 and the sensing lines 230 in the touch screen panel formed on the upper substrate 200' is smaller than a number of pixels, the data lines and the gate lines in the display panel formed on the lower substrate 100'. Thus, in the embodiment shown in FIG. 8, the number of the conducting members 134 can be decreased, thereby enhancing efficiency in terms of process yield.

Although it has been illustrated in FIG. 8 that the sensing patterns 220 of the touch screen panel are formed on the inner surface of the upper substrate 200', embodiments of the present invention are not necessarily limited thereto. That is, the sensing patterns 220 may be formed on the outer surface of the upper substrate 200'. Alternatively, for example, the first sensing cells (220a of FIG. 2) of the sensing patterns 220 may be formed on the inner surface of the upper substrate 200', while the second sensing cells (220a of FIG. 2) may be formed on the outer surface of the upper substrate 200', or vice versa.

While the present invention has been described in connection with certain exemplary embodiments, it is to be understood that the invention is not limited to the disclosed embodiments, but is instead intended to cover various modifications and equivalent arrangements included within the spirit and scope of the appended claims, and equivalents thereof.

What is claimed is:

1. A flat panel display with an integrated touch screen panel, comprising:
    upper and lower substrates each comprising a display area and first and second non-display areas around an outside of the display area;
    a plurality of pixels in the display area of the lower substrate;
    a plurality of sensing patterns in the display area of the upper substrate forming the touch screen panel;
    a plurality of sensing lines in the first non-display area of the upper substrate and connected to the sensing patterns;
    a sealing member between the second non-display areas of the upper and lower substrates;
    a silicon compound in a region between the plurality of pixels and the plurality of sensing patterns and in contact with the sealing member, wherein the silicon compound is not in the touch screen panel;
    a first bonding pad portion in the second non-display area of the upper substrate, the first bonding pad portion comprising a plurality of first bonding pads connected to the plurality of sensing lines;
    a plurality of pads in the second non-display area of the lower substrate overlapping with the sealing member; and
    a second bonding pad portion in the second non-display area of the upper substrate adjacent to the first bonding pad portion, the second bonding pad portion comprising a plurality of second bonding pads electrically connected to the plurality of pads of the lower substrate,
    wherein the first bonding pads and the second bonding pads are positioned outside of the sealing member,
    wherein the upper substrate is a window substrate positioned as an uppermost one of a plurality of substrates provided in the flat panel display,
    wherein a plurality of conducting members electrically connected to respective ones of the pads of the lower substrate are in the sealing member and overlapping with the plurality of pads of the lower substrate,
    wherein a plurality of metal patterns that connect the plurality of conducting members with the second bonding pads are in the second non-display area of the upper substrate and overlap with the sealing member.

2. The flat panel display according to claim 1, wherein the upper substrate is a glass substrate having a surface that is subjected to reinforcement treatment.

3. The flat panel display according to claim 2, wherein the reinforcement treatment of the surface comprises replacing sodium (Na) elements on the surface of the glass substrate with potassium (K) elements.

4. The flat panel display according to claim 1, wherein the plurality of conducting members comprise conducting balls.

5. The flat panel display according to claim 1, wherein a flexible printed circuit board (FPCB) configured to be electrically connected to the first and second bonding pads is configured to be attached to an end portion of the second non-display area of the upper substrate.

6. The flat panel display according to claim 1, wherein a length of the upper substrate is longer than a length of the lower substrate.

7. The flat panel display according to claim 1, wherein a black matrix is in the first and second non-display areas of the upper substrate to outline the display area.

8. The flat panel display according to claim 1, wherein the sensing patterns comprise:
first sensing cells connected along a first direction;
first connection lines for connecting the first sensing cells along the first direction;
second sensing cells connected along a second direction; and
second connection lines for connecting the second sensing cells along the second direction.

9. The flat panel display according to claim 8, wherein the sensing patterns are in a same layer.

10. The flat panel display according to claim 9, wherein the second sensing cells are integrally formed with the second connection lines.

11. The flat panel display according to claim 10, further comprising an insulating layer interposed at crossing regions between the first and second connection lines.

12. The flat panel display according to claim 9, wherein the sensing patterns are on an inner surface of the upper substrate facing the lower substrate.

13. The flat panel display according to claim 9, wherein the sensing patterns are on an outer surface of the upper substrate.

14. The flat panel display according to claim 8, wherein the first and second sensing cells are in different layers.

15. The flat panel display according to claim 14, wherein the first sensing cells and the first connection lines are on an inner surface of the upper substrate, and the second sensing cells and the second connection lines are on an outer surface of the upper substrate.

16. The flat panel display according to claim 1, further comprising a plurality of signal lines in the first non-display area of the lower substrate for electrically connecting the plurality of pixels to the pads in the second non-display area of the lower substrate.

17. The flat panel display according to claim 16, wherein the plurality of signal lines comprise a plurality of scan lines and a plurality of data lines.

18. A flat panel display with an integrated touch screen panel, comprising:
upper and lower substrates each comprising a display area and first and second non-display areas around an outside of the display area;
a plurality of pixels in the display area of the lower substrate;
a plurality of sensing patterns in the display area of the upper substrate;
a plurality of sensing lines in the first non-display area of the upper substrate and connected to the sensing patterns;
a sealing member between the second non-display areas of the upper and lower substrates;
a first bonding pad portion in the second non-display area of the upper substrate, the first bonding pad portion comprising a plurality of first bonding pads connected to the plurality of sensing lines;
a plurality of pads in the second non-display area of the lower substrate overlapping with the sealing member and electrically connected to data lines or scan lines, wherein the data lines and the scan lines are electrically connected to the plurality of pixels and are configured to apply predetermined signals to the plurality of pixels;
a second bonding pad portion in the second non-display area of the upper substrate and comprising a plurality of second bonding pads; and
a black matrix between a portion of the sealing member and the second non-display area of the upper substrate and between a portion of at least one of the plurality of sensing lines and the first non-display area of the upper substrate,
wherein the plurality of second bonding pads are electrically connected to the plurality of pads of the lower substrate,
wherein the upper substrate is a window substrate positioned as an uppermost one of a plurality of substrates provided in the flat panel display;
wherein a plurality of conducting members electrically connected to respective ones of the pads of the lower substrate are in the sealing member and overlapping with the plurality of pads of the lower substrate, and
wherein a plurality of metal patterns that connect the plurality of conducting members with the second bonding pads are in the second non-display area of the upper substrate and overlap with the sealing member.

19. The flat panel display according to claim 18, wherein a flexible printed circuit board (FPCB) configured to be electrically connected to the first and second bonding pads is configured to be attached to an end portion of the second non-display area of the upper substrate.

* * * * *